United States Patent [19]

Hornbaker et al.

[11] 4,279,808

[45] Jul. 21, 1981

[54] POLYBROMOSTYRENE RESIN

[75] Inventors: Edwin D. Hornbaker; Allan A. Eisenbraun, both of Baton Rouge, La.

[73] Assignee: Ethyl Corporation, Richmond, Va.

[21] Appl. No.: 121,311

[22] Filed: Feb. 14, 1980

[51] Int. Cl.³ .................... C08F 275/00; C08K 3/22; C08L 51/00
[52] U.S. Cl. .............................. 260/45.75 B; 525/71; 525/72; 525/288
[58] Field of Search .......................... 525/71, 72, 288; 260/45.75 B

[56] References Cited

U.S. PATENT DOCUMENTS

| | | | |
|---|---|---|---|
| 3,954,908 | 5/1976 | Nakamura et al. | 525/71 |
| 4,048,263 | 9/1977 | Lee | 525/72 |
| 4,150,066 | 4/1979 | Kudo et al. | 525/71 |
| 4,219,630 | 8/1980 | Rulf et al. | 525/288 |

FOREIGN PATENT DOCUMENTS 52-838   1/1977  Japan .
53-10689 1/1978  Japan .

*Primary Examiner*—Allan Lieberman
*Attorney, Agent, or Firm*—Donald L. Johnson; John F. Sieberth

[57] ABSTRACT

Moldable, thermoplastic resins formed by polymerization of nuclear brominated styrenes in the presence of a rubbery polymer. These resins have high heat deflection temperatures, high resistance to flammability as well as other desirable physical properties.

15 Claims, No Drawings

POLYBROMOSTYRENE RESIN

This invention relates to moldable, flame resistant, thermoplastic resins and, more particularly, to such resins formed by the polymerization of nuclear brominated styrenes in the presence of a rubbery polymeric matrix.

BACKGROUND

Vinyl aromatic resins such as, for example, rubber-modified polystyrenes are useful thermoplastic compositions. However, these resins burn readily and thus cannot be used in applications where flammability resistance is desirable. Attempts to eliminate this deficiency include blending certain compounds into the resin. For example, Japanese Patent Application No. 52-838 assigned to Daiichi Seiyaku Company, Ltd., discloses flame retardant compositions such as nuclear brominated and chlorinated polystyrenes, halogenated polyolefins and antimony trioxide which can be blended with a variety of thermosetting and thermoplastic resins including polystyrene.

Another method to eliminate this deficiency includes preparation of rubber-modified resins by copolymerization in the presence of a rubbery polymer of a monomer mixture consisting of (a) a nuclear brominated styrene and (b) one or more monomers selected from among vinyl aromatic compounds, vinyl cyanides and (meth)acrylic acid esters. See in this connection, Japanese Patent Application No. 53-10689 assigned to Japan Synthetic Rubber Company, Ltd. However, in addition to the required presence of the latter class of compounds, i.e., group (b) monomers, achievement of a V-O rating as determined by the UL-94 test required the addition of flame retardant synergist such as antimony trioxide.

THE INVENTION

This invention provides moldable, flame resistant thermoplastic resins formed by polymerization in the presence of a rubbery polymer of monomers essentially consisting of nuclear brominated styrenes. These resins have heat deflection temperatures above about 110° C. at 264 psi and preferably have a V-O flammability rating as measured by the UL-94 Vertical Burn Test. In a preferred embodiment they have between about 40 weight percent and about 72 weight percent bromine based on the total weight of the resin. The preferred nuclear brominated styrenes employed in the polymerization are the dibromostyrenes, the tribromostyrenes or mixtures thereof. Preferably the rubbery polymer is polybutadiene. The resins of this invention exhibit enhanced heat and burn resistance together with good impact strength without significant diminution of other physical properties necessary for a useful, moldable thermoplastic.

The resins of this invention can be prepared by graft polymerization in suspension, emulsion, solution, and bulk systems. The resins exemplified below were prepared in a suspension polymerization system in which the monomer was polymerized in the presence of the rubbery polymer using benzoyl peroxide as catalyst. However, suspension polymerization may be carried out with other suitable catalysts such as those of the free radical type (e.g. the peroxides, hydroperoxides or azo compounds such as azobisisobutyronitrile). When emulsion polymerization systems are employed, suitable water soluble free radical catalysts such as those of the persulfate type, e.g., potassium persulfate and ammonium persulfate, may be used.

The relative amount of monomer to rubbery polymer used in the reaction can vary according to several factors including the physical properties desired of the resulting resin, in particular impact strength. Other physical properties affected by the amount of rubber used include Heat Distortion Temperature (HDT) and the Underwriter's Laboratory's UL-94 Vertical Burn Test value. Generally, higher monomer to rubbery polymer ratios (weight:weight basis) in the reaction yield resins having higher HDT than resins prepared from systems with lower monomer to rubbery polymer ratios; while lower monomer to rubbery polymer ratios provide resins with higher impact strength. In general, the ratio of the brominated styrene monomer to the rubbery polymer falls within the range of from about 25:1 to 2:1 on a weight to weight basis, preferably from about 15:1 to about 3:1.

The nuclear brominated styrene monomers which may be used in the practice of this invention include, mono-, di-, tri-, tetra- and pentabromo styrenes. Such compounds have the general formula

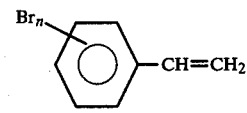

where n is from 1 to 5. The presence of one or more lower alkyl substituents in the ring (e.g., methyl, ethyl, butyl, etc.) is not detrimental. Particularly preferred are the di- and tribrominated styrenes, i.e. where n is 2 or 3. Methods for preparation of nuclear brominated styrenes from styrene have been disclosed in the art and usually involve hydrobromination of the vinyl group followed by bromination of the nuclear ring with subsequent dehydrobromination of the bromoethyl group to form the desired product. See for example Cubbon and Smith in Polymer (1969) 10, pp 479–487. Other methods known in the art for the production of nuclear brominated styrenes may also be employed in the practice of this invention. However, it is preferred to use brominated styrenes which have been carefully purified. A suitable method of purification is distillation of either the bromostyrenes or, as described in Example 1, their bromoethyl precursors.

The rubbery polymers which may be used herein include SBR rubber (butadiene-styrene copolymers), EPR rubber (ethylenepropylene copolymers), EPDM rubber (i.e. terpolymers of ethylene, propylene and a diene monomer), polyisoprene rubber (e.g. cis-1,4-polyisoprene and trans-1,4-polyisoprene), Neoprene (i.e. polymers and copolymers of 2-chloro-1,3-butadiene), cis-1,4-polybutadiene and polybutadienes having mixed structures (e.g. cis-1,4: trans-1,4 and 1,2 structures) with the polybutadienes being particularly preferred.

The resins of this invention are not only useful as moldable thermoplastics per se but also find use as additives which can be blended with other resins to impart increased flame resistance to the blend. Examples of these other resins include such thermoplastics as polyethylene, polystyrene, SAN resins, ABS resins, polypropylene, polybutadienes, petroleum resins, methacrylic resins, vinyl chloride resins, polyamide resins, polycarbonate resins and polyphenylene oxide resins.

The resins disclosed herein may also be blended with phenolic resins, urea resins, melamine resins, unsaturated ester resins, epoxy resins, diallyl phthalate resins, silicone resins and urethane resins and foams.

When the rubber modified resins of this invention are blended with other resins, it may be desirable to add flame retardant synergists to the blends. Exemplary flame retardant synergists include antimony trioxide and zinc borate. A preferred blend includes from about 10 to about 70 (preferably 15 to 50) parts of the rubber modified resins of this invention, about 90 to about 30 (preferably 85 to 50) parts high impact polystyrenes (HIPS) and from about 1 to about 10 parts of a flame retardant synergist, with antimony trioxide being particularly preferred. Blending can be accomplished by methods well known in the art such as dry blending of the components followed by mixing at elevated temperatures.

Other ingredients may be incorporated into the moldable, rubber modified resins of this invention. Thus for example an antioxidant, the function of which is to prevent oxidation, may be incorporated into these resins. Examples of these antioxidants are 1,3,5-trimethyl-2,4,6-tris(3,5-di-tert-butyl-4-hydroxybenzyl) benzene, 2,6-di-tert-butyl-4-methylphenol, 2,5-di-tert-butylhydroquinone, tris-(3,5-di-tert-butyl-4-hydroxyphenyl)-phosphite, tris(nonylphenyl) phosphite, 2,2'-thio-bis-(6-tert-butyl-4-methylphenol), and N-phenyl-$\beta$-naphthylamine. Other illustrative ingredients are pigmentation materials (e.g. titanium dioxide), lubricants, other resins, plasticizers, impact modifiers, etc. These various ingredients may be incorporated into the resins of this invention by dry blending or melt blending, extruding, use of heated rolls or by other mixing procedures known in the art.

Particular embodiments of the present invention are illustrated by the following examples.

EXAMPLE 1

Preparation of Bromostyrene Monomers

2-Bromoethylbenzene (2430 grams) was brominated under anhydrous conditions in the presence of 10.0 grams of anhydrous ferric chloride by the addition of 5243 grams of bromine under vigorous agitation. Bromine was added over a period of 4 hours at temperatures within the range of +5° C. to −5° C. After bromine addition, the mixture was brought to 17° C. over a period of 2 hours. The reaction mixture was washed with a solution of 50 grams of sodium sulfite in 330 ml water and then with a solution of 60 grams of sodium bisulfate in one liter of water. Five additional washes each with one liter of water were made. The washed product was evacuated to remove small amounts of residual water left from the washing. A 2.3 gram portion of trimethylolpropane-tris-mercaptopropionate was added as a stabilizer to prevent decomposition in the subsequent distillation step. The product at this point weighed 4629 grams and was purified by distillation in a 2-inch diameter Pope Molecular Still. The distillation was carried out at pressures in the range of 0.026–0.040 mm Hg, temperatures in the range of 106°–125° C. and with a feed rate of about 160 drops per minute. The distilled product weighed 4134 grams and a small amount of low boilers was discarded. A heavy, undistilled oil (436.2 grams) was obtained as by-product.

A 1588 gram portion of the distilled product was added slowly under anhydrous conditions to a freshly prepared and vigorously stirred solution of 316 grams of metallic potassium in 4100 ml absolute ethanol at a temperature of 15° C. over a period of 20 minutes. After this period the mixture was stirred at 33° C. for an additional 2 hours and 20 minutes. To the stirred mixture were added 6 liters of water. The product was separated as the heavy phase and was purified by repeated washing with water. A crystalline material weighing 45 grams, presumably 2,4,5-tribromostyrene, was separated by filtration. Residual water from the dehydrobrominated product was removed by evacuation to 0.1 mm Hg at room temperature. The product was then further purified by distillation in the Pope Molecular Still at a pressure of 0.095–0.120 mm Hg, a temperature of 86°–118° C. and a feed rate of about 160 drops per minute.

A sample was then analyzed by gas chromotography and the individual compounds were characterized by mass spectroscopy. Table I shows the results obtained.

TABLE I

CHARACTERIZATION AND ANALYSIS OF BROMOSTYRENE MIXTURE

| COMPOUND | MOLE % |
| --- | --- |
| 2,4-Dibromostyrene | 29.48 |
| 2,5-Dibromostyrene | 4.29 |
| 2,3-Dibromostyrene | 26.26 |
| 2,3,4-Tribromostyrene | 0.13 |
| 2,4,5-Tribromostyrene | 37.76 |
| 2,3,6-Tribromostyrene | 2.08 |

EXAMPLE 2

Preparation of Rubber-Modified Polybromostyrene Resin

Into a 2-liter resin flask was charged a solution of 4.5 grams PVP-K-90 (a high molecular weight polyvinylpyrrolidone supplied by General Aniline and Film Company) in 1000 ml deionized water. The flask was partially immersed in an oil bath and was equipped with a mechanical stirrer, thermometer, reflux condenser and means for addition of reactants. A 90 gram quantity of FRS-272 (a polybutadiene latex containing 51.4 percent solids, obtained from the Firestone Company) was slowly added with stirring. After evacuation of air and replacement with nitrogen the 300 grams of dibromo- and tribromostyrene mixture prepared in Example 1 was slowly added. A solution of 0.5 grams of acetic acid and 49.5 grams of water was then added to the reaction mixture and the oil bath was regulated at 75.0° C. The reaction mixture reached a thermal equilibrium of 73.5° C. at which time polymerization was started by addition of a freshly prepared solution of 0.6 grams benzoyl peroxide in 8.4 grams of the monomer prepared in Example 1.

Temperature of the reaction mixture reached a maximum of 74.5° C. at 37 minutes after peroxide addition, and after an additional 42 minutes the oil bath temperature was increased to 103° C. and kept at this temperature for an additional 7 hours. The bath was then allowed to cool. All the monomer was polymerized and the polymerization product was isolated, washed with water and dried, first in air and then in a vacuum oven at 60° C.

EXAMPLE 3

Preparation of Fused Rubber-Modified Polybromostyrene Resin

Into the REE-6 mixing head of a Brabender Plastograph was charged 85.0 grams of the above dried polymer. The apparatus was run at 35 rpm and after 7¾ minutes at 50 rpm head temperature was 205°–219° C. and torque 3000–4400 meter-grams. Addition time was 1¾ minutes and total hot mixing time 8½ minutes. The polymer fused to a thermoplastic material in the Brabender and was then compression molded at 205° C. to a 6"×3"×⅛" sheet. Physical properties are given in Table II.

EXAMPLE 4

Preparation of Rubber-Modified Polybromostyrene-Styrene Blend

In this instance 19.3 parts of a rubber-modified polybromostyrene resin prepared as in Example 2 (except that 1 ml of 1 N NaOH was charged to the resin flask with the PVP-K-90), 76.7 parts of high impact polystyrene (Shell Oil Company Compound 333*) and 4 parts of antimony trioxide were dry mixed and then fused in a Brabender Plastograph at 255° C. Hot mixing time was 10 minutes and the mixing torque was 200 meter-grams at the end of the mixing operation. Addition time was ½ minute and the mixing speed was 35 rpm. The resulting blend had a specific gravity of 1.194 g/ml, a tensile yield of 2520 psi, a 1 percent elongation at break, a tensile modulus of 272,000 psi, a heat distortion temperature of 73° C. (at 264 psi), a notched Izod Impact of 0.7 ft-lbs per inch of notch, and a UL-94 rating of V-1.

*This product had the following physical properties: a specific gravity of 1.029 g/ml, a tensile yield of 2340 psi, a tensile break of 2000 psi, an elastic modulus of 236,000 psi, an Izod Impact of 1.10 ft-lbs per inch of notch, a heat distortion temperature of 72.8°–73.8° C. (at 264 psi), a 25 percent elongation at break and failed to meet a V-2 rating by the UL-94 test.

COMPARATIVE EXAMPLE 1

Preparation of Rubber-Modified Polystyrene Resin

In the same apparatus as described in Example 1 was charged a solution of 4.5 grams PVP-K-90 in 1000 ml of deionized water and stirring was started. Added was 90 grams of polybutadiene latex FRS-272. In the monomer reservoir was placed 300 grams styrene. Air in the entire apparatus was removed and replaced with nitrogen by alternately evacuating and filling with nitrogen. Monomer was added followed by the injection of a solution of 0.5 grams acetic acid in 49.5 grams water. The oil bath was then heated to 92.2° C. and maintained at this temperature. When the reaction mixture reached thermal equilibrium of 89.5° C. polymerization was initiated by the addition of a freshly prepared solution of 0.6 grams benzoyl peroxide in 5 grams of styrene. Temperature of the reaction mixture increased to 90.2° C. after 38 minutes and after 153 minutes bath temperature was increased to 103.2° C. and kept at this temperature for an additional 15 hours, then allowed to cool. The polymerization product was isolated and washed with water. The product after drying in air and vacuum weighed 318.7 grams.

COMPARATIVE EXAMPLE 2

Preparation of Fused Rubber-Modified Polystyrene Resin

Into the REE-6 mixing head of the Brabender Plastograph was charged 51.0 grams of the above dried polymer. The apparatus was run at 35 rpm. Head temperature was 205°–208° C. and torque was 1500–900 meter-grams. Addition time was 1 minute and total hot mixing time was 5 minutes. The polymer fused to a thermoplastic material in the Brabender and then was compression molded at 205° C. to a 6"×3"×⅛" sheet. Physical properties are shown in Table II below.

TABLE II

| PHYSICAL PROPERTIES OF GRAFT POLYMERS | | |
|---|---|---|
| | EXAMPLE 3 | COMPARATIVE EXAMPLE 2 |
| Tensile yield, psi | 5,150 | 4,170 |
| Tensile break, psi | 5,150 | 4,170 |
| Elongation at break, % | 1.7 | 1.6 |
| Elastic modulus, psi | 336,000 | 281,000 |
| Notched Izod Impact, ft-lbs per inch of notch | 0.8 | 1.0 |
| Heat Deflect. Temp. [At 264 psi, (°C.)] | 122 | 77.5 |
| Specific Gravity | 1.802 | 1.028 |
| Flammability | V-0 | (*) |

*Failed to meet standard required for a V-2 rating

Physical properties presented in Table II were determined in accordance with ASTM procedures where applicable: tensile yield—D-638-77; tensile break—D-638-77; elongation at break—D-638-77; elastic modulus—D-638-77; notched Izod Impact—D-256-78; heat deflection temperature—D-72; specific gravity—D-792-66. Flammability testing involved subjecting compression molded plaques to the UL-94 Vertical Burn Test. In this test the flammability characteristics of the material are determined in relation to specified test criteria and a rating applied. The highest rating is 94-V-0. For a material to be classified 94-V-0 it must meet three criteria. Of five specimens of the material tested, (1) none shall burn with flaming combustion for more than ten seconds after each application of the test flame, (2) the five specimens shall not have a total flaming combustion time exceeding 50 seconds, and (3) none of the specimens shall burn with flaming or glowing combustion up to the holding clamp. Materials that resist burning but do not meet the standards required by the V-0 flame test may be classified V-1 or V-2 depending on their burn times, V-2 being the lowest rating. The term "flame resistant" is intended to include compositions with a V-0, V-1 or a V-2 rating. The procedure for testing the specimens is outlined in Underwriters' Laboratories "The Standard for Tests for Flammability of Plastic Materials for Parts in Devices and Appliances", subject 94, September 1973, pp 6–10, which is incorporated herein by reference.

The resins of this invention can be molded by conventional means such as, for example, injection molding to make thermoplastic articles. They may also be used as additives blendable with other resins for the improvement of certain physical properties e.g. resistance to flammability.

What is claimed is:

1. Moldable, flame resistant thermoplastic resins formed by addition polymerization of
   (a) monomers consisting of nuclear brominated styrenes in the presence of
   (b) a rubbery polymer selected from the group consisting of a diene rubber and an ethylenepropylene rubber, the weight ratio of (a):(b) falling within the range of about 25:1 to 2:1.

2. A resin of claim 1 wherein the weight ratio falls within the range of from about 15:1 to about 3:1.

3. A resin of claim 1 having a heat deflection temperature of at least about 110° C. at 264 psi as measured by the ASTM procedure D-648-72.

4. A resin of claim 1 having a bromine content within the range of about 40 weight percent to about 72 weight percent based on the total weight of the resin.

5. A resin of claim 1 wherein said rubbery polymer is polybutadiene.

6. A resin of claim 1 wherein said resin has a rating of V-0 as measured by the UL-94 test.

7. A resin of claim 1 wherein said styrenes are dibromostyrene, tribromostyrene or mixtures thereof.

8. A resin of claim 1 having a heat deflection temperature of at least about 110° C. at 264 psi as measured by the ASTM procedure D-648-72 and having a bromine content within the range of about 40 weight percent to about 72 weight percent based on the total weight of the resin.

9. A moldable, flame resistant thermoplastic resin formed by addition polymerization of
(a) a monomer essentially consisting of dibromostyrene, tribromostyrene or a mixture thereof in the presence of
(b) a rubbery polymer selected from the group consisting of a diene rubber and an ethylene-propylene rubber, the weight ratio of (a):(b) falling within the range of about 25:1 to 2:1, said resin being characterized by having a heat deflection temperature of at least about 110° C. at 264 psi as measured by the ASTM procedure D-648-72, a bromine content within the range of about 40 weight percent to about 72 weight percent based on the total weight of the resin and a rating of V-0 as measured by the UL-94 flame resistancy test.

10. A resin of claim 9 wherein the weight ratio falls within the range of from about 15:1 to about 3:1.

11. A thermoplastic blend comprising on a weight basis:
(1) Between about 10 and about 70 parts of a moldable, flame resistant thermoplastic resin formed by addition polymerization of
  (a) monomers consisting of nuclear brominated styrenes in the presence of
  (b) a rubbery polymer selected from the group consisting of a diene rubber and an ethylenepropylene rubber, the weight ratio of (a):(b) falling within the range of about 25:1 to 2:1; and
(2) Between about 90 and about 30 parts of a high impact polystyrene.

12. A blend of claim 11 wherein the weight ratio of (a):(b) falls within the range of from about 15:1 to about 3:1.

13. A blend of claim 11 wherein said resin is present in an amount of from about 15 to about 50 parts and said polystyrene is present in an amount of from about 85 to about 50 parts.

14. The blend of claim 11 further including from about 1 to about 10 parts of a flame retardant synergist.

15. A blend of claim 14 wherein said synergist is antimony trioxide.

* * * * *